(12) United States Patent
Kawauchi et al.

(10) Patent No.: US 10,819,608 B2
(45) Date of Patent: Oct. 27, 2020

(54) INFORMATION COMMUNICATION SYSTEM, INFORMATION COMMUNICATION METHOD, AND SERVER

(71) Applicant: Hitachi, Ltd., Tokyo (JP)

(72) Inventors: Takashi Kawauchi, Tokyo (JP); Akira Kanehira, Tokyo (JP); Eriko Ando, Tokyo (JP); Takayuki Suzuki, Tokyo (JP); Chinatsu Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/409,901

(22) Filed: May 13, 2019

(65) Prior Publication Data

US 2019/0356569 A1  Nov. 21, 2019

(30) Foreign Application Priority Data

May 17, 2018 (JP) .................................. 2018-095546

(51) Int. Cl.
*H04L 12/26* (2006.01)
*H04W 4/44* (2018.01)

(52) U.S. Cl.
CPC ........... *H04L 43/0888* (2013.01); *H04W 4/44* (2018.02)

(58) Field of Classification Search
CPC ................. H04L 43/0888; H04W 4/44; G08G 1/096775; G06F 15/17306
See application file for complete search history.

(56) References Cited

U.S. PATENT DOCUMENTS

2014/0297110 A1* 10/2014 Noda ................ H04L 12/40006
701/36
2019/0183761 A1* 6/2019 Weser .................... A61K 8/602
(Continued)

FOREIGN PATENT DOCUMENTS

| JP | 2006-005658 A | 1/2006 |
| JP | 2012-164227 A | 8/2012 |
| JP | 2016-48809 A | 4/2016 |

OTHER PUBLICATIONS

Extended European Search Report received in corresponding European Application No. 19174096.8 dated Nov. 7, 2019.

*Primary Examiner* — Dady Chery
(74) *Attorney, Agent, or Firm* — Mattingly & Malur, PC

(57) ABSTRACT

A plurality of in-vehicle information collecting devices mounted on a plurality of vehicles; a center server to manage each in-vehicle information collecting device as a communication target; and a communication unit to relay communication between each in-vehicle information collecting device and the center server are included. Each in-vehicle information collecting device has an in-vehicle controller to transmit/receive information including vehicle information to/from the center server, and the center server includes a server controller to transmit/receive information to/from each in-vehicle controller. The server controller, when receiving the vehicle information from each in-vehicle controller, analyzes the received vehicle information, generates speed information defining a transmission speed of the vehicle information based on an analysis result, and transmits the generated speed information to each in-vehicle controller. Each in-vehicle controller controls a communication amount of the vehicle information to the server controller, based on the speed information received from the server controller.

9 Claims, 14 Drawing Sheets

(56) References Cited

U.S. PATENT DOCUMENTS

2019/0265966 A1\* 8/2019 Shimomura .......... B60R 16/023
2019/0376809 A1\* 12/2019 Hanniel ................. G06F 16/29
2020/0005644 A1\* 1/2020 Ichimaru ................ G08G 1/164

\* cited by examiner

FIG. 1
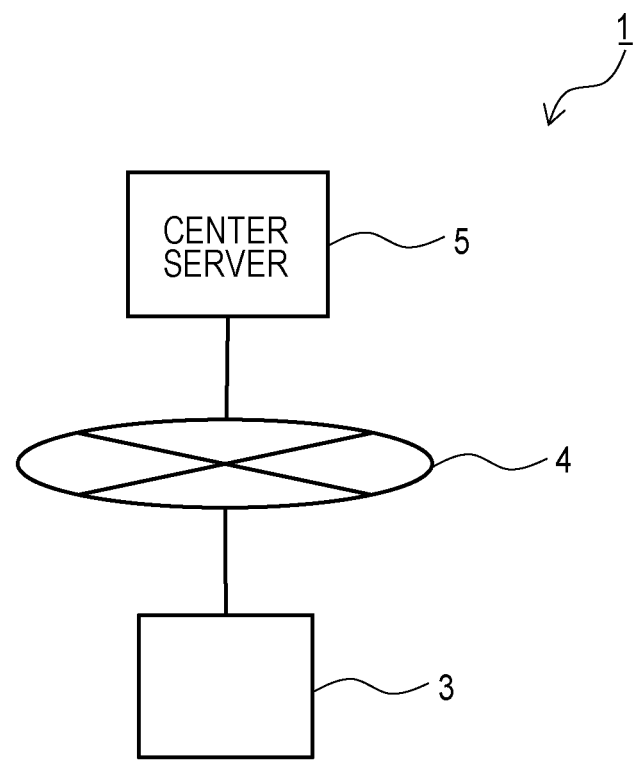
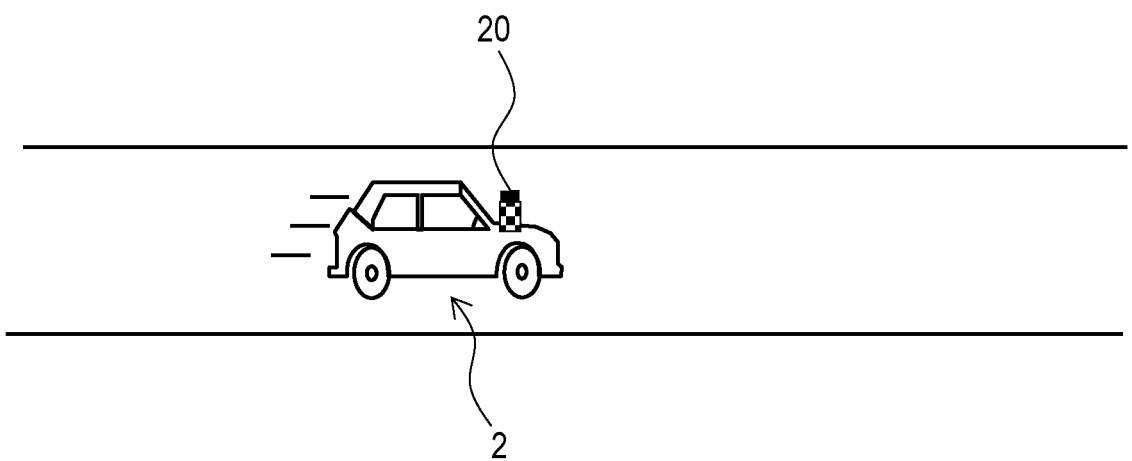

| SERVICE ID | LIMIT SPEED | DIRECTION RESTRICTION | FIRST LATITUDE INFORMATION | SECOND LATITUDE INFORMATION | FIRST LONGITUDE INFORMATION | SECOND LONGITUDE INFORMATION |
|---|---|---|---|---|---|---|
| 359 | 30 | 10 | 4807.038247 | N | 01131.324523 | E |
| ... |  | ... | ... | ... | ... | ... |
| 601 | 602 | 603 | 604 | 605 | 606 | 607 |

| SERVICE ID | SPEED PARAMETER | TIME |
|---|---|---|
| 200 | 60 | 12:35:19.00 |
| 701 | 702 | 703 |

FIG. 10

| | CONTRACT INFORMATION | REGISTRANT'S ADDRESS | CAR INFORMATION | DISCOUNT INFORMATION | ENTRANCE TOLLGATE | FINAL EXIT TOLLGATE | ENTRY TIME | EXIT TIME | DATE |
|---|---|---|---|---|---|---|---|---|---|
| | ... | YOKOHAMA CITY, KANAGAWA PREFECTURE | PRIVATE | PRIVATE | YOKOHAMA CITY, KANAGAWA PREFECTURE | MINATO WARD, TOKYO | 12:30 to 12:40 | 12:50 to 13:00 | 2014/10/02 |
| | ... | ... | ... | ... | ... | ... | ... | ... | ... |
| | 1002 | 1003 | 1004 | 1005 | 1006 | 1007 | 1008 | 1009 | 1010 |

| USER ID | |
|---|---|
| 5 | |
| ... | |
| 1001 | |

552

| BEHAVIOR ID | SPEED | ACCELERATION | FIRST LATITUDE INFORMATION | SECOND LATITUDE INFORMATION | FIRST LONGITUDE INFORMATION | SECOND LONGITUDE INFORMATION |
|---|---|---|---|---|---|---|
| 359 | 30 to 40 | 10 | 4807.038247 | N | 01131.324523 | E |
| ... | ... | ... | ... | ... | ... | ... |
| 1011 | 1012 | 1013 | 1014 | 1015 | 1016 | 1017 |

FIG. 15

| ROAD ID | CONNECTION POINT 1 | | | | | | CONNECTION POINT 2 | | | | | | LANE NUMBER |
|---|---|---|---|---|---|---|---|---|---|---|---|---|---|
| | LATITUDE1 INFORMATION | LATITUDE2 INFORMATION | LONGITUDE1 INFORMATION | LONGITUDE2 INFORMATION | CONNECTION ROAD ID | LATITUDE1 INFORMATION | LATITUDE2 INFORMATION | LONGITUDE1 INFORMATION | LONGITUDE2 INFORMATION | CONNECTION ROAD ID | | | |
| 1 | 4807.038247 | N | 01131.324523 | E | — | 4807.038147 | N | 01131.324423 | E | 2,3,4 | 2 | | 1500-1 |
| 2 | 4807.038248 | N | 01131.324524 | E | 1 | 4807.038047 | N | 01131.324324 | E | — | 3 | | 1500-2 |
| ⋮ | | | | | | | | | | | ⋮ | | 1500-Ne |

1500 {above table}

1501, 1502, 1503, 1504, 1505, 1506, 1507, 1508, 1509, 1510, 1511, 1512

INFORMATION COMMUNICATION SYSTEM, INFORMATION COMMUNICATION METHOD, AND SERVER

CROSS-REFERENCE TO PRIOR APPLICATION

This application relates to and claims the benefit of priority from Japanese Patent Application number 2018-095546, filed on May 17, 2018 the entire disclosure of which is incorporated herein by reference.

BACKGROUND OF THE INVENTION

1. Field of the Invention

The present invention relates to an information communication system, an information communication system method, and a server, for performing a service based on data analysis.

2. Description of the Related Art

In recent vehicles, environments for easily collecting and managing control data of each electrical control unit (ECU) mounted on a vehicle have been developed along with the widespread use of an in-vehicle local area network (LAN). As part of a technique to use such environment, development of a system (so-called remote diagnosis) to add a communication function to a vehicle, and use this communication function to collect vehicle information and a behavior history and a movement history of a user from remote locations is progressing. In addition, there is a demand for a technique for recommending appropriate service contents in accordance with user's behavior and situation from the above collected information. Therefore, a technique has been proposed for estimating attributes and situations such as user's interests and preferences from various historical information, such as estimating user's interest information from a browsing history of book information on a website to recommend books on a website of an online book store. Here, in such efforts, since availability of Web browsing histories is high, consideration is required. Although availability of a global positioning system (GPS) movement history has increased recently due to mounting on a mobile phone or the like, efforts are relatively less for movement histories. Here, in a case of using a movement history, it is easy to obtain a history of all time zones during a day by the recent widespread use of smartphones and the like. Therefore, there is also a possibility of realizing a context-aware service that adapts to a user's situation, and potential usability is high.

Regarding behavior estimation of a user by using a position history, for example, the technique described in JP 2012-164227 A is known. In the action and attribute estimation device, method, and program described in JP 2012-164227 A, it is possible to calculate a score of a spot that is considered to be visited by a user, in consideration of rarity (uncommonness) of appearance of a user in a stay area, and to use this score to estimate genre (that is, user's preference) and user's action.

Whereas, a wide area communication network such as a mobile phone network is charged, and a communication band is narrow. Therefore, there is a problem such as a high communication cost in a case of constantly transmitting detailed vehicle information or the like to a data center. Further, considering the communication cost and the like, limitation of an amount of information may also be required in providing other information with high added value, and there is a problem of a possibility that information useful for the user is not to be sufficiently provided.

Regarding problems such as a communication band and a communication amount at the time of information collection, for example, the technique described in JP 2006-5658 A is known. An on-vehicle communication device described in JP 2006-5658 A is a vehicle information communication system including: a data center capable of data communication between with an on-vehicle device via a wide-area communication module; and a local spot capable of data communication between with the data center and capable of data communication between with the on-vehicle device via a narrow-area communication module when the vehicle enters a communication area. The on-vehicle device analyzes vehicle data collected from an on-vehicle unit, and transmits vehicle data processed into vehicle data with a small data amount on the basis of the analysis result to the data center by preferentially using the wide-area communication module.

SUMMARY OF THE INVENTION

However, in the technique described in JP 2012-164227 A, a communication cost, a communication band, and a storage cost related to data collection are not taken into consideration. In the technique described in JP 2006-5658 A, consideration is given to reduction of a communication cost by analyzing the vehicle data by the on-vehicle device to process into vehicle data with a small data amount. However, since rarity of data acquired by the vehicle is not taken into consideration from the viewpoint of the center of data analysis, it is not possible to reduce the optimum communication cost, communication band, and storage cost of the entire system.

An object of the present invention is to determine a communication amount of vehicle information to be subjected to data analysis, in accordance with a service.

To solve the above-mentioned problems, the present invention includes: a plurality of in-vehicle information collecting devices individually mounted on a plurality of vehicles; a center server configured to manage each of the plurality of in-vehicle information collecting devices as a communication target; and a communication unit configured to relay communication between each of the plurality of in-vehicle information collecting devices and the center server. Each of the in-vehicle information collecting devices includes an in-vehicle controller configured to transmit/receive information including vehicle information on each of the vehicles, to/from the center server via the communication unit. The center server includes a server controller configured to transmit/receive information to/from an in-vehicle controller of each of the in-vehicle information collecting devices via the communication unit. When receiving the vehicle information from each the in-vehicle controller, the server controller analyzes the received vehicle information, generates speed information that defines a transmission speed of the vehicle information on the basis of an analysis result; and transmits the generated speed information to each the in-vehicle controller. When receiving the speed information from the server controller, each the in-vehicle controller controls a communication amount of the vehicle information to the server controller on the basis of the received speed information.

According to the present invention, it is possible to determine a communication amount of vehicle information to be subjected to data analysis, in accordance with a service.

BRIEF DESCRIPTION OF THE DRAWINGS

FIG. 1 is a configuration diagram of a vehicle information network system according to an embodiment of the present invention;

FIG. 6 is an explanatory view illustrating a configuration of analysis information;

FIG. 7 is an explanatory view illustrating a configuration of speed information;

FIG. 10 is an explanatory view illustrating a configuration of an anonymized vehicle information DB;

FIG. 15 is an explanatory view illustrating a configuration of map information.

DESCRIPTION OF THE PREFERRED EMBODIMENTS

Figure 2:
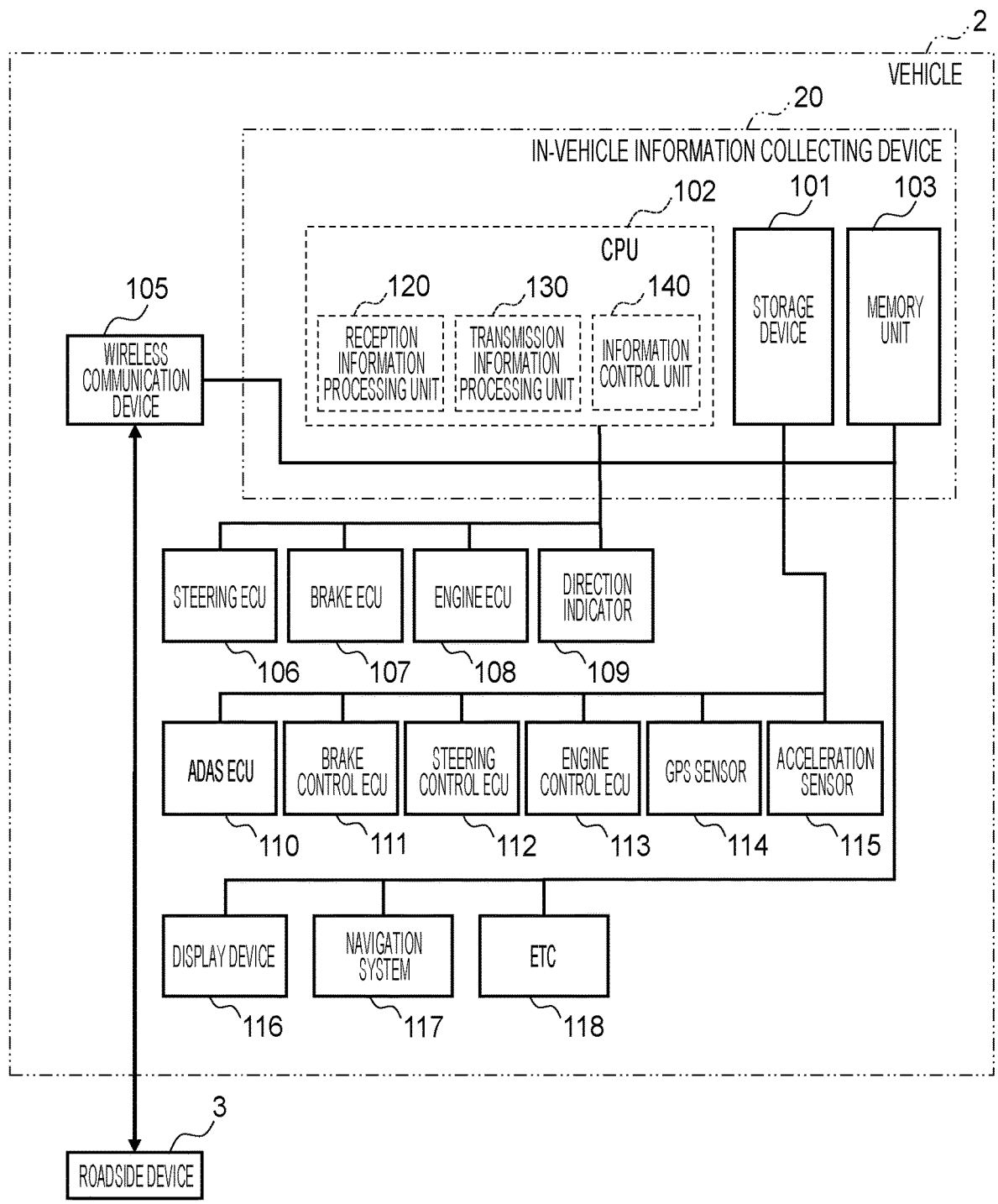
FIG. 2 is a block diagram illustrating a hardware configuration of a vehicle and an in-vehicle information collecting device.

Hereinafter, an embodiment of the present invention will be described with reference to FIGS. 1 to 10. FIG. 1 is a configuration diagram of a vehicle information network system according to an embodiment of the present invention. A vehicle information network system 1 shown in FIG. 1 is an information communication system, and includes a vehicle 2, a roadside device 3, a network 4, and a center server 5. The vehicle 2 is mounted with an in-vehicle information collecting device 20. The roadside device 3 is installed and fixed at a predetermined point on a road side of a road on which the vehicle 2 travels. The roadside device 3 and the center server 5 are mutually connected via the network 4. The center server 5 performs data communication with the in-vehicle information collecting device 20 via the network 4 and the roadside device 3. As the network 4, for example, a wide area network (WAN) can be used. Although one vehicle 2 and one roadside device 3 are shown, the vehicle information network system 1 may include a plurality of vehicles 2 each mounted with the in-vehicle information collecting device 20. Further, a plurality of roadside devices 3 may be installed at different points.

At this time, the center server 5 manages, as a communication target, the in-vehicle information collecting device 20 mounted in each vehicle 2, and executes data communication between with each communication target. For example, when the center server 5 receives vehicle information including information indicating a position, a behavior, and a control state of each vehicle 2 from the in-vehicle information collecting device 20 mounted on each vehicle 2, the center server 5 analyzes the received vehicle information, determines a position, a speed, and the like of each vehicle 2 from the analysis result, generates speed information and analysis information on the basis of the analysis result, and transmits the generated speed information and analysis information to the in-vehicle information collecting device 20 of each vehicle 2. When receiving the speed information from the center server 5, the in-vehicle information collecting device 20 of each vehicle 2 controls a communication amount of the vehicle information to the center server 5 on the basis of the received speed information. When receiving the analysis information from the center server 5, the in-vehicle information collecting device 20 displays the received analysis information as information of an information service.

Further, on the assumption that the same in-vehicle information collecting device 20 is installed in each vehicle 2, a description is given while focusing on an operation of the in-vehicle information collecting device 20 mounted in one vehicle 2, in the following description.

FIG. 2 is a block diagram illustrating a hardware configuration of the vehicle 2 and the in-vehicle information collecting device 20. The vehicle 2 includes the in-vehicle information collecting device 20, and a wireless communication device 105, a steering ECU 106, a brake ECU 107, an engine ECU 108, a direction indicator 109, an advanced driver assistance systems (ADAS) ECU 110, a brake control ECU 111, a steering control ECU 112, an engine control ECU 113, a GPS sensor 114, an acceleration sensor 115, a display device 116, a navigation system 117, and an electronic toll collection system (ETC) 118 each connected to the in-vehicle information collecting device 20.

The steering ECU 106, the brake ECU 107, the engine ECU 108, and the direction indicator 109 are devices to perform traveling control of the vehicle 2, and are mutually connected to form a network. Hereinafter, this network will be referred to as "control system network domain".

The ADAS ECU 110, the brake control ECU 111, the steering control ECU 112, the engine control ECU 113, the GPS sensor 114, and the acceleration sensor 115 are devices to perform driving assistance and automatic driving of the vehicle 2, and are mutually connected to form a network. Hereinafter, this network will be referred to as "driving assistance system network domain".

The display device 116, the navigation system 117, and the ETC 118 are devices to provide a user interface to a driver of the vehicle 2, and are mutually connected to form a network. Hereinafter, this network will be referred to as "information system network domain". That is, the in-vehicle information collecting device 20 is connected to the control system network domain, the driving assistance system network domain, and the information system network domain, and performs data communication between with each device in these networks.

In each of the above networks, each device in the same network can directly perform data communication without going through the in-vehicle information collecting device 20. For example, within the control system network domain, communication for traveling control of the vehicle 2 is performed. Within the driving assistance system network domain, communication for driving assistance and automatic driving of the vehicle 2 is performed. Within the information system network domain, communication for a user interface to the driver of the vehicle 2 is performed. Whereas, data communication between devices belonging to different networks is performed via the in-vehicle information collecting device 20.

The wireless communication device 105 is connected to the in-vehicle information collecting device 20 and performs wireless communication between with the roadside device 3. The in-vehicle information collecting device 20 performs data communication with the roadside device 3 through wireless communication via the wireless communication device 105.

The steering ECU 106 is a device to control a traveling direction by controlling a steering mechanism of the vehicle 2, in accordance with a steering operation by the driver of the vehicle 2 or a steering control command transmitted from the steering control ECU 112. The brake ECU 107 is a device to perform deceleration control by controlling a brake of the vehicle 2, in accordance with a brake operation by the driver of the vehicle 2 or a brake control command transmitted from the brake control ECU 111. The engine ECU 108 is a device to control an engine of the vehicle 2 to perform speed control in accordance with a running state of the vehicle 2 or an engine control command transmitted from the engine control ECU 113. The direction indicator 109 is a device, when the vehicle 2 changes the route, to turn on a light provided to the vehicle 2 and notifies other surrounding vehicles of a direction of the route change, in accordance with a direction instruction operation by the driver of vehicle 2 or a direction instruction command transmitted from the ADAS ECU 110. By these devices, traveling control of the vehicle 2 is performed.

The ADAS ECU 110 is a device to determine acceleration, deceleration, stop, and the like of the vehicle 2 from information inside and outside of the vehicle 2, and to realize automatic driving and driving assistance service of the vehicle 2 by using the determination result. The ADAS ECU 110 refers to a position of the vehicle 2 acquired from the GPS sensor 114, an acceleration of the vehicle 2 acquired from the acceleration sensor 115, surrounding map information of the vehicle 2 held by the navigation system 117, and the like, to calculate a behavior of the vehicle 2. Then, the ADAS ECU 110 instructs the brake control ECU 111, the steering control ECU 112, and the engine control ECU 113 to individually output control commands corresponding to the determined behavior of the vehicle 2. This allows the ADAS ECU 110 to automatically perform all of the acceleration, steering, and braking of the vehicle 2, and to realize the automatic driving function of the vehicle 2.

By using the automatic driving function of the ADAS ECU 110, a user who is the driver of the vehicle 2 can automatically drive the vehicle 2 to a destination without performing a driving operation. For example, when the vehicle 2 is traveling to a destination while maintaining a same traveling lane, the ADAS ECU 110 determines a traveling direction and a traveling speed of the vehicle 2 along a shape of the traveling lane on the basis of the map information acquired from the navigation system 117, and individually transmits vehicle information including control parameters corresponding to these values to the brake control ECU 111, the steering control ECU 112, and the engine control ECU 113. This allows the vehicle 2 to be automatically driven along the traveling lane. Further, for example, when the vehicle 2 changes the lane while performing automatic driving, the ADAS ECU 110 controls an operation of the direction indicator 109 and lights the direction indicator 109 in the direction of changing the lane.

The brake control ECU 111 is a device to transmit a brake control command including a brake strength to the brake ECU 107, in response to an instruction from the ADAS ECU 110. The steering control ECU 112 is a device to transmit a steering control command including a steering operation angle to the steering ECU 106, in response to an instruction from the ADAS ECU 110. The engine control ECU 113 is a device to transmit an engine control command including an engine speed to the engine ECU 108, in response to an instruction from the ADAS ECU 110. The GPS sensor 114 is a positioning device to receive a signal from a satellite and measure a position of the vehicle 2. The acceleration sensor 115 is a device to detect an acceleration in a front-back direction and a right-left direction of the vehicle 2. By these devices, driving assistance and automatic driving of the vehicle 2 are performed.

The display device 116 is, for example, a liquid crystal monitor or the like, and displays various kinds of information to the driver. For example, when automatic driving or driving assistance is being performed in the vehicle 2, displaying on the display device 116 that these functions are effective allows the driver to grasp the state of the vehicle 2. The navigation system 117 holds map information such as a road shape, and is a device to provide map information around the vehicle 2 in response to a request or the like from the user or the ADAS ECU 110. By these devices, a user interface for the driver of the vehicle 2 is provided.

The in-vehicle information collecting device 20 includes a storage device 101, a central processing unit (CPU) 102, and a memory unit 103. The storage device 101 is an auxiliary storage device such as a hard disk drive (HDD) or a flash memory. The CPU 102 reads and executes a predetermined control program stored in the storage device 101 or the like, for example, and thereby controlling the in-vehicle information collecting device 20.

The memory unit 103 is a main storage device used by the CPU 102 in executing the control program.

The CPU 102 functions as an in-vehicle controller, and functionally includes a reception information processing unit 120, a transmission information processing unit 130, and an information control unit 140. That is, the reception information processing unit 120, the transmission information processing unit 130, and the information control unit 140 are realized in terms of software by the control program executed by the CPU 102. The reception information processing unit 120, the transmission information processing unit 130, and the information control unit 140 will be described in detail later.

Note that the reception information processing unit 120, the transmission information processing unit 130, and the information control unit 140 each can also be constituted by electronic circuits or the like that can realize functions equivalent to those of the CPU 102, such as a field programmable gate array (FPGA).

Figure 3:
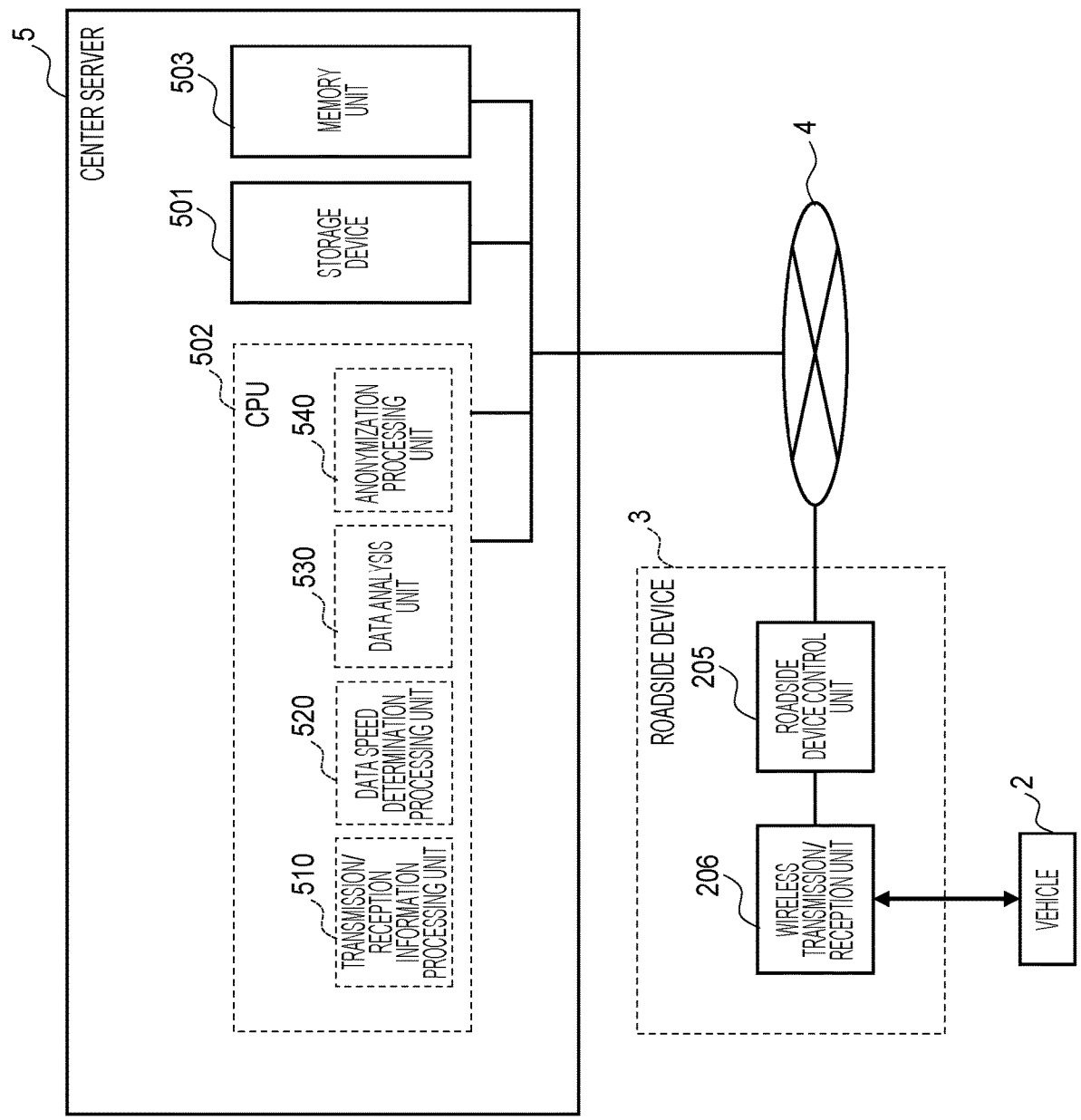
FIG. 3 is a block diagram illustrating a hardware configuration of a roadside device and a center server.

FIG. 3 is a block diagram illustrating a hardware configuration of the roadside device 3 and the center server 5. The roadside device 3 includes a roadside device control unit 205 and a wireless transmission/reception unit 206.

The wireless transmission/reception unit 206 performs data communication with the in-vehicle information collecting device 20 mounted on the vehicle 2, by transmitting and receiving wireless signals. The roadside device control unit 205 controls the roadside device 3. The roadside device control unit 205 is connected to the network 4. The roadside device control unit 205 performs data communication with the center server 5 via the network 4. The roadside device control unit 205 controls the wireless transmission/reception unit 206 to transmit information transmitted from the center server 5 to the vehicle 2, and transmits information received from the vehicle 2 to the center server 5.

The center server 5 includes a storage device 501, a CPU 502, and a memory unit 503. The storage device 501 is an auxiliary storage device such as an HDD or a flash memory. The CPU 502 reads and executes a predetermined control program stored in the storage device 501 or the like, for example, and thereby processing information to be transmitted to and received from the roadside device 3. The memory unit 503 is a main storage device used by the CPU 502 in executing the control program.

The CPU 502 functions as a server controller, and functionally includes a transmission/reception information processing unit 510, a data speed determination processing unit 520, a data analysis unit 530, and an anonymization processing unit 540. That is, the transmission/reception information processing unit 510, the data speed determination processing unit 520, the data analysis unit 530, and the anonymization processing unit 540 are realized in terms of software by the control program executed by the CPU 502. The transmission/reception information processing unit 510, the data speed determination processing unit 520, the data analysis unit 530, and the anonymization processing unit 540 will be described later in detail.

Next, functional configurations of the in-vehicle information collecting device 20 and the center server 5 will be described.

Figure 4:
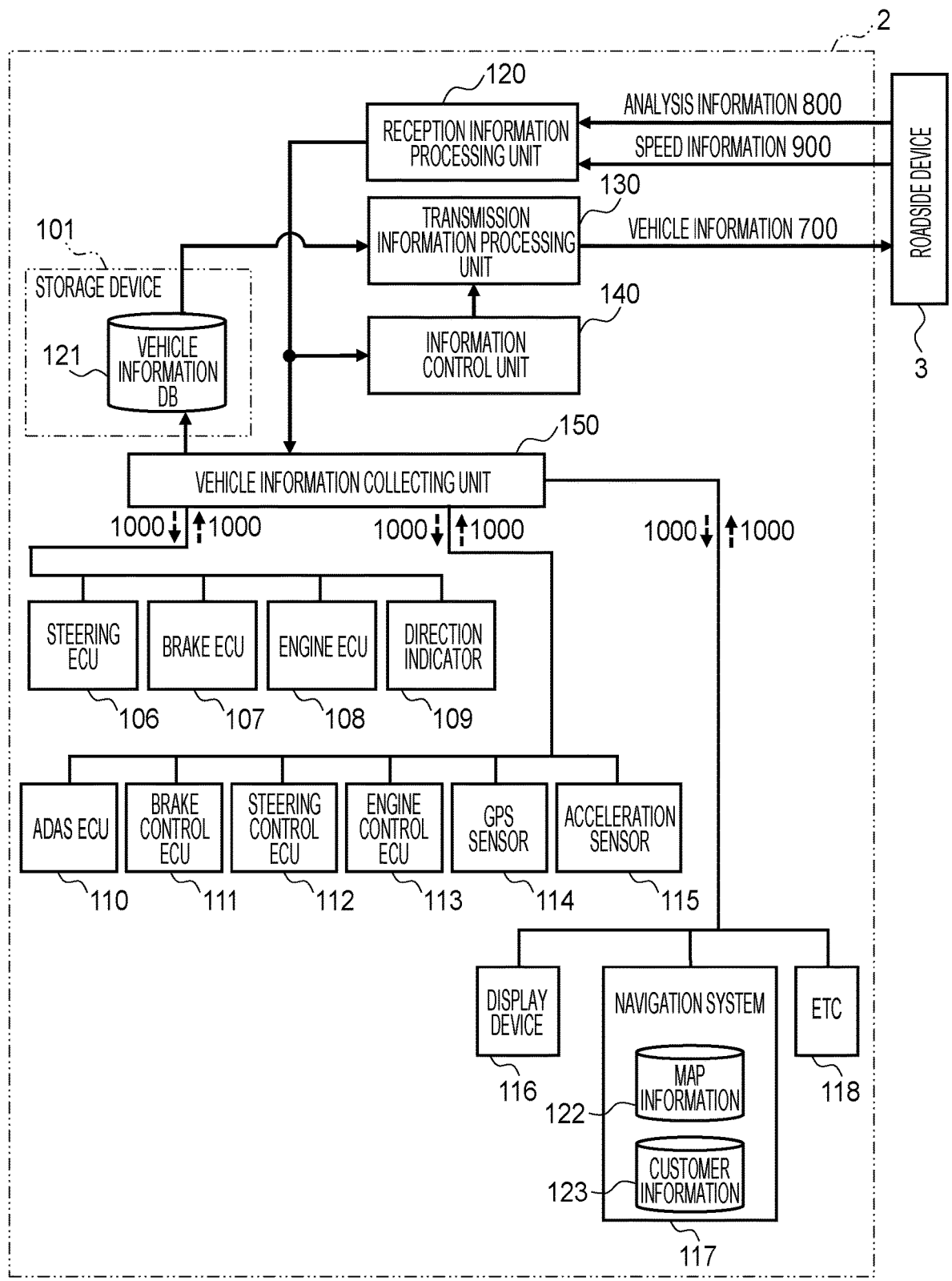
FIG. 4 is a block diagram illustrating a functional configuration of the in-vehicle information collecting device.

FIG. 4 is a block diagram illustrating a functional configuration of the in-vehicle information collecting device 20. The storage device 101 has a vehicle information DB (database) 121.

The reception information processing unit 120 communicates with the roadside device 3 by using the wireless communication device 105 (not shown), and receives analysis information 800 and speed information 900 from the center server 5 via the roadside device 3. The received analysis information 800 and speed information 900 are outputted to the information control unit 140.

The transmission information processing unit 130 collects vehicle information stored in the vehicle information DB 121, map information 122 and customer information 123 stored in the navigation system 117, and the like, and transmits vehicle information 700 to the center server 5 via the roadside device 3 in accordance with a transmission speed instructed by the information control unit 140.

A vehicle information collecting unit 150 relays communication between individual networks connected to the in-vehicle information collecting device 20. For example, the vehicle information collecting unit 150 transfer, between these networks, a brake control instruction transmitted from the brake control ECU 111 of the driving assistance system network domain to the brake ECU 107 of the control system network domain. Between devices in a same network and between devices in different networks, communication is performed by a vehicle control packet 1000. Upon receiving the vehicle control packet 1000 transmitted and received between the individual devices, the vehicle information collecting unit 150 additionally writes information included in the packet into the vehicle information DB 121 as vehicle information representing a control state of the vehicle 2. That is, the vehicle information DB 121 stores information included in the vehicle control packet 1000 as vehicle information in a chronological order.

The information control unit 140 controls a transmission speed of the vehicle information 700 to be transmitted by the transmission information processing unit 130, on the basis of the speed information 900 received from the center server 5 via the roadside device 3. At this time, upon receiving a communication speed control instruction based on the speed information 900 from the information control unit 140, the transmission information processing unit 130 accelerates and decelerates the communication speed to the roadside device 3 in accordance with the communication speed control instruction.

The display device 116 displays information based on the analysis information 800 received by the reception information processing unit 120, and thereby performing an information service such as status notification to the user.

Figure 5:
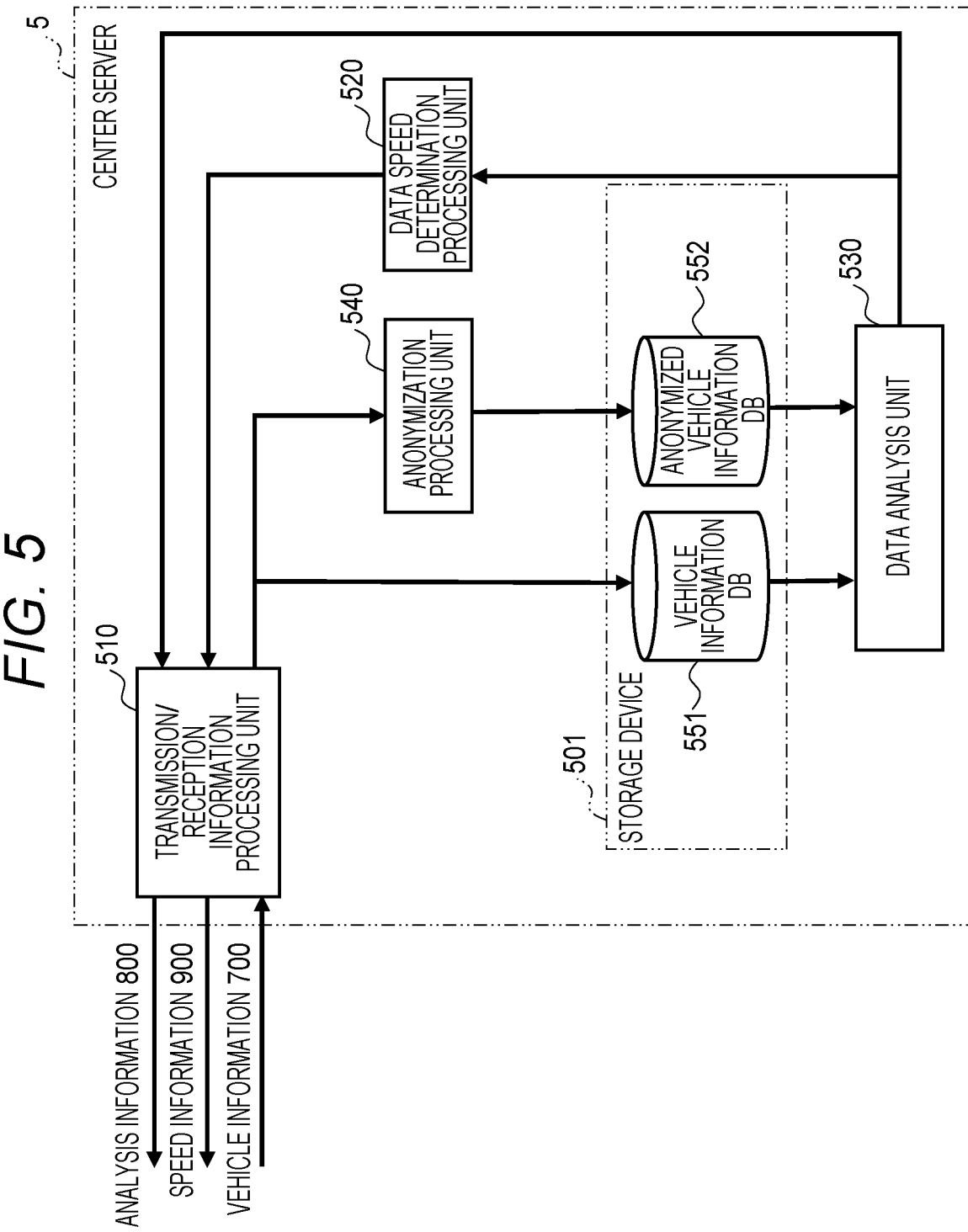
FIG. 5 is a block diagram illustrating a functional configuration of the center server.

FIG. 5 is a block diagram illustrating a functional configuration of the center server 5. The storage device 501 has a vehicle information DB 551 and an anonymized vehicle information DB 552.

The transmission/reception information processing unit 510 transmits/receives information to/from the roadside device 3. For example, the transmission/reception information processing unit 510 receives the vehicle information 700 transmitted from the vehicle 2, via the roadside device 3. The transmission/reception information processing unit 510 stores the vehicle information 700 received from the vehicle 2, in the vehicle information DB 551. The anonymization processing unit 540 performs anonymization processing on the received vehicle information 700, and then stores the anonymized vehicle information 700 in the anonymized vehicle information DB 552.

The data analysis unit 530 analyzes the vehicle information 700 stored in the vehicle information DB 551 and the anonymized vehicle information DB 552, and notifies the data speed determination processing unit 520 and the transmission/reception information processing unit 510 of the analysis result.

The data speed determination processing unit 520 generates the analysis information 800 and the speed information 900 on the basis of the analysis result of the data analysis unit 530. The transmission/reception information processing unit 510 transmits the analysis information 800 and the speed information 900 generated by the data speed determination processing unit 520, to the vehicle 2 via the roadside device 3.

Here, in analyzing the vehicle information 700 by the data analysis unit 530, the data speed determination processing unit 520 determines a required data amount in accordance with a type of service provided to the user in consideration that a required data amount of data to be subjected to data analysis varies depending on a type of service (data analysis service), and generates the speed information 900 serving as a data transmission speed of the in-vehicle information collecting device 20 on the basis of the determined data amount. As a service provided to the user, for example, there are: a passable map, which is a service of analyzing data from the vehicle 2 as to whether a road can be passed or not, and notifying the vehicle 2 of the analysis result; and situation grasping, which is a service of analyzing data such as a traveling speed of the vehicle 2 traveling on a road, determining the presence or absence of traffic jam, and notifying the vehicle 2 of the determination result.

In analyzing data on these services, a data amount required for data analysis varies for each service. For example, in a case of the passable map, data analysis for a service using the passable map can be performed as long as information indicating a passage history of one vehicle 2 exists each between a plurality of road IDs indicating a section to be analyzed among the roads.

Whereas, in the situation grasping, since the behavior of the vehicle 2 varies depending on each vehicle, it is necessary to collect data from a plurality of vehicles 2 in order to determine whether the behavior of the vehicle 2 is a standard behavior or an abnormal behavior, and the required data amount is greater than the data amount required by the passable map. For example, when considering that there is a vehicle 2 that has stopped due to an accident or a failure in a traffic jam, it is necessary to collect data from a plurality of vehicles 2 in order to determine a large number of vehicles moving at low speed as a standard behavior and to determine the stopped vehicle 2 as an abnormal behavior due to an accident or a failure. Since the required data amount thus varies for each service, the required data amount is determined on the basis of the number of vehicles 2 (the number of vehicles) and the like being present in each section of the road. The required data amount may be the number of vehicles, or may be the number of data and a variation of data values.

When providing the service of the passable map to the vehicle 2, the data speed determination processing unit 520 determines whether the road can be passed or not, by using a movement history in which position information (position information of the vehicle 2) belonging to the vehicle information 700 is collected from time to time from the vehicle 2 (the in-vehicle information collecting device 20 mounted on the vehicle 2). In determining whether the road can be passed or not, if a plurality of vehicles 2 stop before a certain section of the road during a certain time, and there is no vehicle 2 passing through the certain section, then the data speed determination processing unit 520 determines as a closed section on the basis of a position information history of the vehicle 2 being present on the road.

Whereas, in providing the service of the situation grasping to the vehicle 2, the data speed determination processing unit 520 collects, from the vehicle 2, position information and behavior information such as a wiper operation, sudden braking, rapid acceleration, a vehicle speed, and the like from time to time as information belonging to the vehicle information 700, and determines a traffic jam situation and a weather situation of the road. On the basis of the position information history and the behavior information of the vehicle 2 being present on the road to be analyzed for the traffic jam situation, when it is detected that a plurality of vehicles 2 showing a specific behavior are present before a certain section on the road, the data speed determination processing unit 520 grasps the traffic jam situation with an average vehicle speed of the vehicle 2 located in a certain section, as a means to measure the severity of the traffic jam.

At this time, the center server 5 determines the required data amount (communication amount) in accordance with a type of service provided to the user, generates the speed information 900 serving as a data transmission speed of the in-vehicle information collecting device 20 on the basis of the determined data amount, and transmits the generated speed information 900 to the in-vehicle information collecting device 20. The in-vehicle information collecting device 20 transmits the vehicle information 700 to the center server 5 at a data transmission speed specified by the speed information 900. Therefore, since the vehicle information 700 of the data amount required for data analysis is transmitted from the vehicle 2 to the center server 5, it is possible to inhibit suppression on a communication band of a communication route connecting the in-vehicle information collecting device 20 of the vehicle 2 with center server 5, and inhibit suppression on a data capacity for data to be stored in the center server 5. As a result, the communication cost can be reduced, the communication band can be protected, and the data storage cost can be reduced.

In a case of analyzing data on services, it is also possible to determine rarity of data. For example, in the case of the passable map, if there is a vehicle 2 stopped on a route even if the data analysis shows that the vehicle 2 can pass the route, the data transmitted by the stopped vehicle 2 can be determined as rare data. In addition, in the case of the situation grasping, with respect to data of a large number of vehicles moving at a low speed (vehicles showing a standard behavior), data transmitted by a small number of vehicles 2 that are stopped and show an abnormal behavior due to an accident or a failure can be determined as rare data. In addition, the standard for determining data as rare data may be data having a value outside a range of a certain fixed value from an average value (average value of the data amount) of the vehicles 2 being present in a certain section, or may be determined within a certain range of deviation values of a parameter, such as a speed (speed of the vehicle 2), to be used for data analysis.

Further, in detecting a behavior of the vehicle 2, it is possible to perform an incident detection of detecting the vehicle 2 that has stopped due to an accident, a failure, or the like, with the collected vehicle information 700. At this time, it is possible to collect vehicle information 700 from a plurality of vehicles 2 and determine whether the behavior is a standard behavior, or an abnormal behavior such as occurrence of an incident, on the basis of the collected vehicle information 700. For example, when considering that there is a vehicle 2 that has stopped due to an accident or a failure in a traffic jam, a large number of vehicles 2 moving at a low speed can be determined as a vehicle group exhibiting a standard behavior, and the stopped vehicle 2 can be detected as a vehicle 2 exhibiting an abnormal behavior as an accident or a failure.

FIG. 6 is an explanatory view illustrating a configuration of the analysis information 800. The analysis information 800 includes each piece of information of a service identification (ID) 601, a limit speed 602, direction restriction 603, first latitude information 604, second latitude information 605, first longitude information 606, and second longitude information 607.

The service ID 601 is a number that can uniquely identify a service (data analysis service). To the service ID, a service to be provided is defined in advance. For values of the service IDs, values unique to individual road links are preset so as not to be overlapped with each other.

The limit speed 602 represents a limit speed that is set for a road link corresponding to the analysis information 800. In accordance with a value of the limit speed 602, an upper limit value of a traveling speed during automatic driving of the vehicle 2 is set.

The direction restriction 603 represents a direction of a road link corresponding to the analysis information 800. The direction restriction 603 is expressed by an angle with a predetermined direction (for example, the magnetic north direction) set to 0.

The first latitude information 604 is a latitude value representing a position of a road link corresponding to the analysis information 800. Latitude indicates 0° at the equator and indicates up to 90° to the north and the south. North latitude 90° and south latitude 90° are the North Pole and the South Pole respectively. The second latitude information 605 is information indicating whether a value of the first latitude information 604 is a north latitude (N) or a south latitude (S).

The first longitude information 606 is a longitude value representing a position of a road link corresponding to the analysis information 800. Longitude indicates 0° at the north-south line passing through the former Royal Observatory, Greenwich, and indicates up to 180° to the east and the west. The second longitude information 607 is information indicating whether a value of the first longitude information 606 is an east longitude (E) or a west longitude (W).

FIG. 7 is an explanatory view illustrating a configuration of the speed information 900. The speed information 900 includes each piece of information of a service ID 701, a speed parameter 702, and a time 703.

The service ID 701 is a number that can uniquely identify a service (data analysis service). To the service ID, a service to be provided (data analysis service such as the passable map and the situation grasping) is defined in advance. For values of the service IDs, unique values are preset so as not to be overlapped with each other.

The speed parameter 702 indicates a transmission speed of the vehicle information 700 according to the service ID 701. When the service provided by the vehicle 2 that has received the speed information 900 is the corresponding service ID 701, the transmission speed of the vehicle information 700 to the roadside device 3 is set in the speed parameter 702.

The time 703 is information indicating a transmission time (time) of the speed information 900. When transmitting the speed information 900, the center server 5 sets information indicating a time at that time as the time 703.

Figure 8:
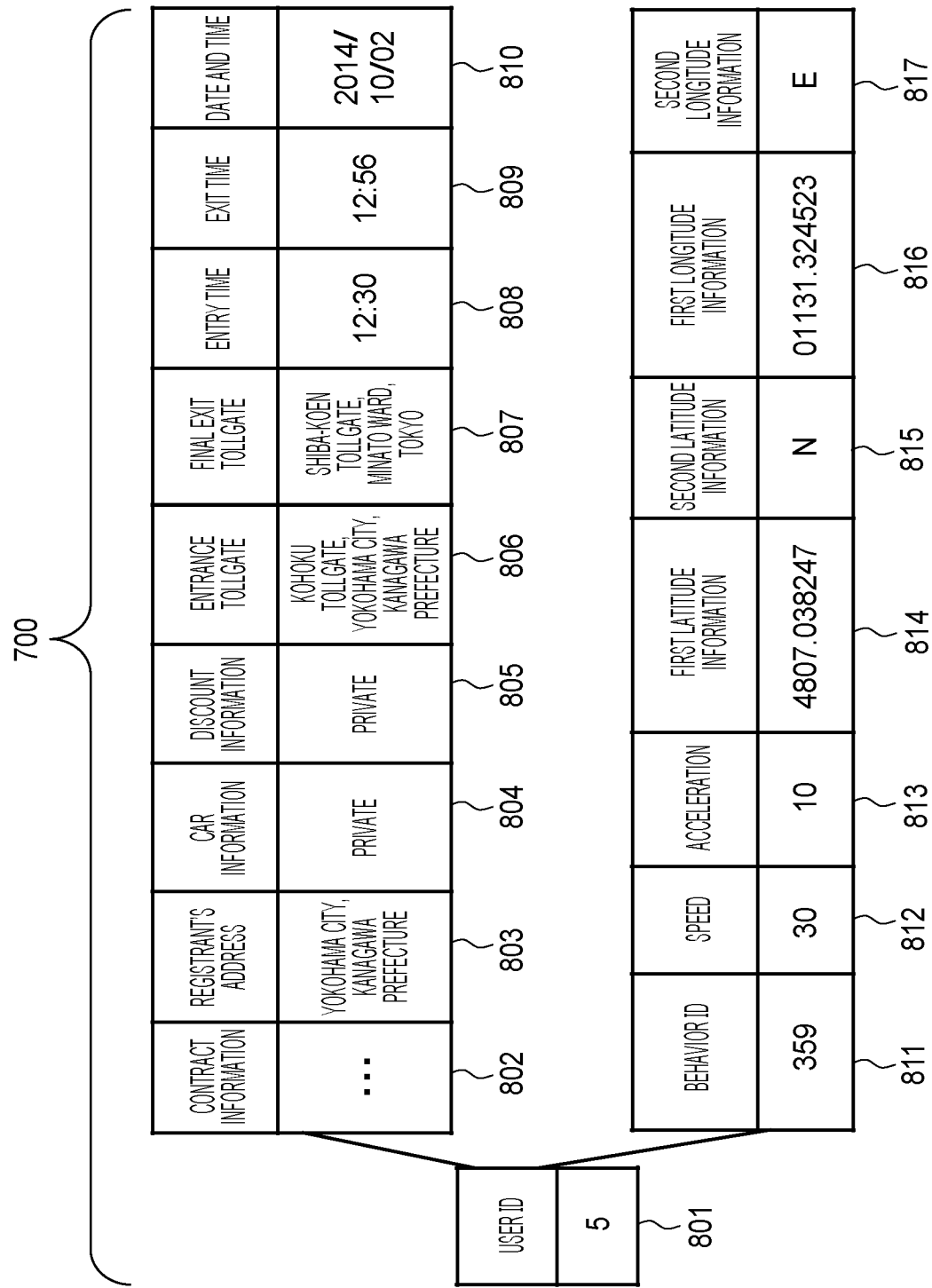
FIG. 8 is an explanatory view illustrating a configuration of vehicle information.

FIG. 8 is an explanatory view illustrating a configuration of the vehicle information 700. The vehicle information 700 includes each piece of information of a user ID 801, contract information 802, a registrant's address 803, car information 804, discount information 805, an entrance tollgate 806, a final exit tollgate 807, an entry time 808, an exit time 809, a date and time 810, a behavior ID 811, a speed 812, an acceleration 813, first latitude information 814, second latitude information 815, first longitude information 816, and second longitude information 817.

The user ID 801 is information indicating an ID that is set for each vehicle 2. In each vehicle 2, a number unique to each vehicle is preset as the user ID. When transmitting the vehicle information 700, the vehicle 2 sets, as the user ID 801, the information indicating the user ID that is set to the vehicle 2.

The contract information 802 is information that defines a service providing range and a service provision level. The registrant's address 803 is an address of a registrant of the service. The car information 804 is a vehicle type such as a private car or a business vehicle, or a vehicle size such as a large vehicle, a small vehicle, or the like.

The discount information 805 is discount information applied when the vehicle 2 uses a highway or the like. The entrance tollgate 806 is information indicating a name of an entrance tollgate or a tollgate ID uniquely assigned, when the vehicle 2 uses a highway or the like. In each tollgate, a number unique to each tollgate is preset as the tollgate ID.

The final exit tollgate 807 is information indicating a name of a final exit tollgate or a tollgate ID uniquely assigned, when the vehicle 2 uses a highway or the like. In each tollgate, a number unique to each tollgate is preset as the tollgate ID.

The entry time 808 is a time when the vehicle 2 has passed through an entrance tollgate when using a highway or the like. The exit time 809 is a time when the vehicle 2 has passed through a final exit tollgate when using a highway or the like.

The date and time 810 is a use date and time when the vehicle 2 uses a highway or the like.

The behavior ID 811 is information indicating an ID that is set for each behavior when sudden acceleration, sudden deceleration, long stoppage, or a failure of the vehicle 2 is detected. A number unique to each behavior is preset as a behavior ID.

The speed 812 is a vehicle speed at the time of measurement of the vehicle 2. The acceleration 813 is a vehicle acceleration at the time of measurement of the vehicle 2.

The first latitude information 814 is position information at the time of measurement of the vehicle 2. The first latitude information 814 indicates an angle, and represents an angle formed by a line in contact with the point and an earth's axis connecting the north pole and the south pole. The second latitude information 815 is position information at the time of measurement of the vehicle 2, and shows N indicating the north or S indicating the south.

The first longitude information 816 is position information at the time of measurement of the vehicle 2. The first longitude information 816 indicates an angle, and represents an angle between a meridian passing through the point and a prime meridian. The second longitude information 817 is position information at the time of measurement of the vehicle 2, and shows W indicating the west or E indicating the east.

Figure 9:
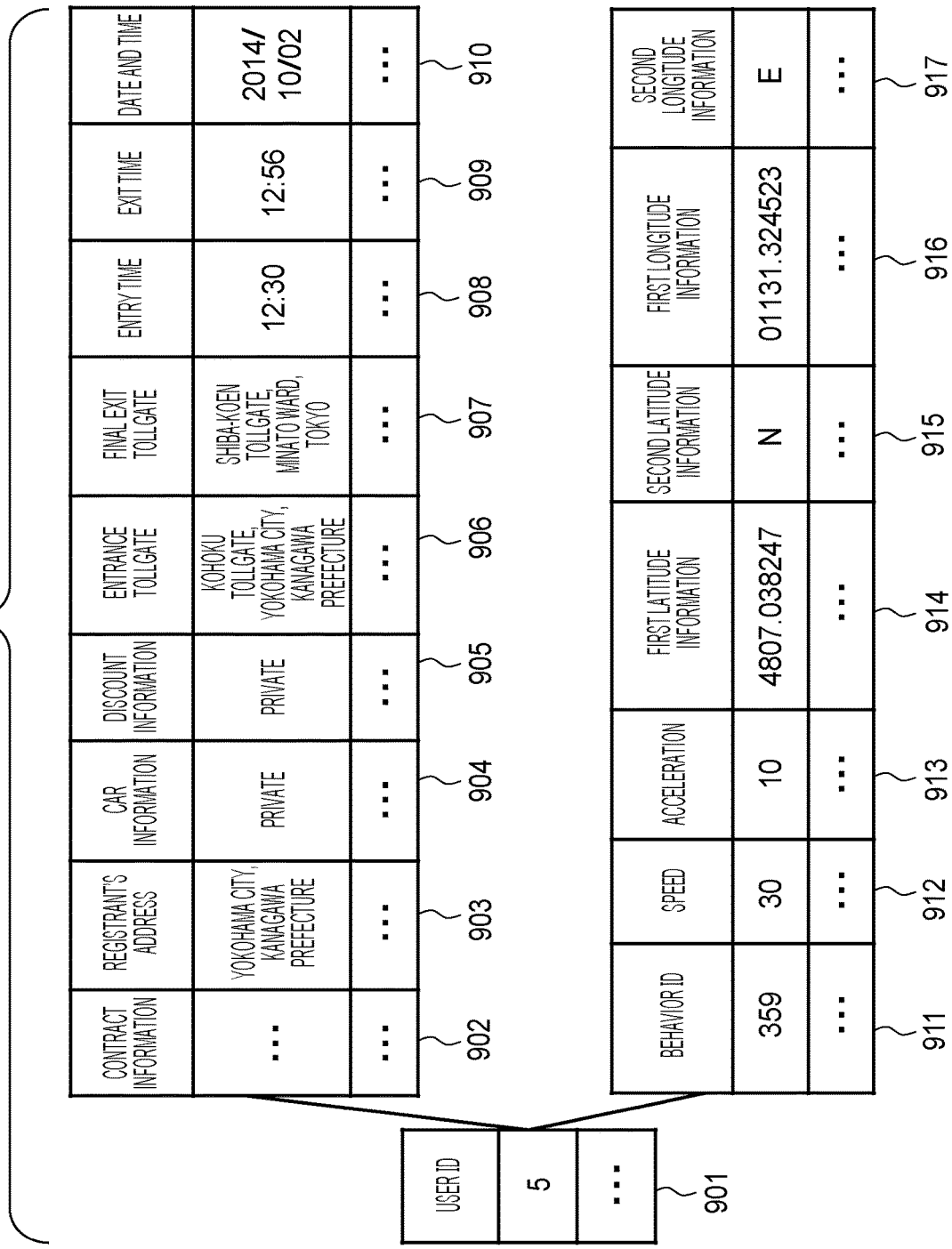
FIG. 9 is an explanatory view illustrating a configuration of a vehicle information DB.

FIG. 9 is an explanatory view illustrating a configuration of a vehicle information table stored in the vehicle information DB 551. The vehicle information table includes each piece of information of a user ID 901, contract information 902, a registrant's address 903, car information 904, discount information 905, an entrance tollgate 906, a final exit tollgate 907, an entry time 908, an exit time 909, a date and time 910, a behavior ID 911, a speed 912, an acceleration 913, first latitude information 914, second latitude information 915, first longitude information 916, and second longitude information 917. The vehicle information DB 551 sequentially accumulates the collected vehicle information 700.

Information stored in the vehicle information table of FIG. 9 (the user ID 901, the contract information 902, the registrant's address 903, the car information 904, the discount information 905, the entrance tollgate 906, the final exit tollgate 907, the entry time 908, the exit time 909, the date and time 910, the behavior ID 911, the speed 912, the acceleration 913, the first latitude information 914, the second latitude information 915, the first longitude information 916, and the second longitude information 917) is similar to the information recorded in the vehicle information 700 of FIG. 8 (the user ID 801, the contract information 802, the registrant's address 803, the car information 804, the discount information 805, the entrance tollgate 806, the final exit tollgate 807, the entry time 808, the exit time 809, the date and time 810, the behavior ID 811, the speed 812, the acceleration 813, the first latitude information 814, the second latitude information 815, the first longitude information 816, and the second longitude information 817), so that the description will be omitted.

FIG. 10 is an explanatory view illustrating a configuration of an anonymized vehicle information table stored in the anonymized vehicle information DB 552. The anonymized vehicle information table includes each piece of information of a user ID 1001, contract information 1002, a registrant's address 1003, car information 1004, discount information 1005, an entrance tollgate 1006, a final exit tollgate 1007, an entry time 1008, an exit time 1009, a date and time 1010, a behavior ID 1011, a speed 1012, an acceleration 1013, first latitude information 1014, second latitude information 1015, first longitude information 1016, and second longitude information 1017. The anonymized vehicle information DB 552 sequentially accumulates the collected anonymized vehicle information 700.

Information stored in the anonymized vehicle information table (the user ID 1001, the contract information 1002, the registrant's address 1003, the car information 1004, the discount information 1005, the entrance tollgate 1006, the final exit tollgate 1007, the entry time 1008, the exit time 1009, the date and time 1010, the behavior ID 1011, the speed 1012, the acceleration 1013, the first latitude information 1014, the second latitude information 1015, the first longitude information 1016, and the second longitude information 1017) is similar to the information recorded in the vehicle information 700 of FIG. 8 (the user ID 801, the contract information 802, the registrant's address 803, the car information 804, the discount information 805, the entrance tollgate 806, the final exit tollgate 807, the entry time 808, the exit time 809, the date and time 810, the behavior ID 811, the speed 812, the acceleration 813, the first latitude information 814, the second latitude information 815, the first longitude information 816, and the second longitude information 817) except that a part (the entrance tollgate 1006, the final exit tollgate 1007, the entry time 1008, the exit time 1009, and the speed 1012) is anonymized, so that the description will be omitted.

Figure 11:
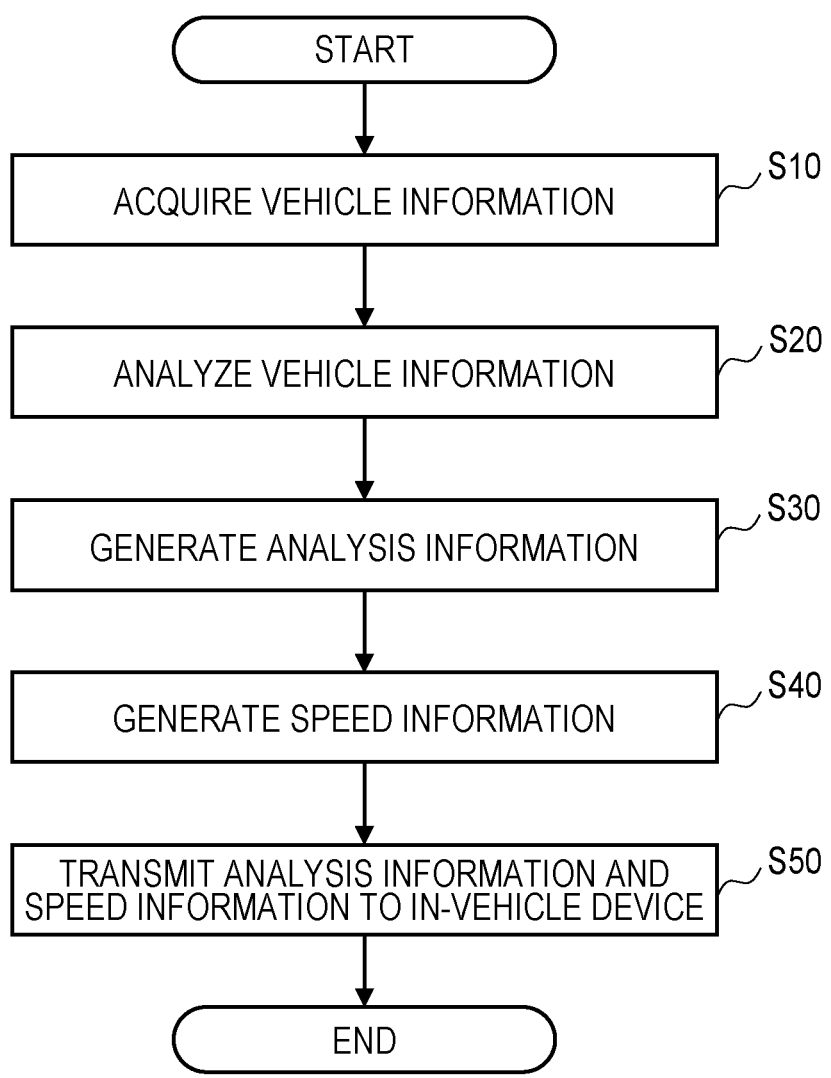
FIG. 11 is a flowchart of data processing of the center server.

FIG. 11 is a flowchart of data speed determination processing executed by the CPU 502 of the center server 5.

In step S10, the CPU 502 reads and acquires information (vehicle information 700) of the vehicle information table accumulated in the vehicle information DB 551, by the data analysis unit 530.

In step S20, the CPU 502 analyzes the vehicle information 700 by the data analysis unit 530, on the basis of the vehicle information 700 acquired in step S10.

In step S30, the CPU 502 generates the analysis information 800 by the data speed determination processing unit 520, from the analysis result of the data analysis unit 530 in step S20.

In step S40, the CPU 502 generates the speed information 900 by the data speed determination processing unit 520, on the basis of the analysis result of the data analysis unit 530.

In step S50, the CPU 502 transmits, by the transmission/reception information processing unit 510, the analysis information 800 generated in step S30 and the speed information 900 generated in step S40, to the in-vehicle device (in-vehicle information collecting device 20) of the vehicle 2 via the roadside device 3.

Here, when the in-vehicle information collecting device 20 transmits/receives information to/from the center server 5, the in-vehicle information collecting device 20 inquires of the center server 5 about a type of data required for the service provided to the user or for the contracted information service. The center server 5 determines whether the data amount required for the service is satisfied for the number of vehicles 2 present between the plurality of road IDs indicating the section to be analyzed, generates speed information corresponding to the determination result, and transmits the generated speed information to the in-vehicle information collecting device 20. That is, the in-vehicle information collecting device 20 increases or decreases the transmission speed of the vehicle information 700 in accordance with the number of vehicles 2 present in the section, in accordance with the instruction (speed information) from the center server 5.

Further, the transmission speed of data may be increased or decreased depending on rarity of data. In that case, as described above, the in-vehicle information collecting device 20 receives an average value of individual parameters of the collected data of the vehicles 2 in the section from the center server 5, and increases the transmission speed of the vehicle information 700 more than the transmission speed instructed by the center server 5 with the speed information 900 if a certain parameter of data acquired from the vehicle 2 deviates from the received average value. Further, the transmission speed may be changed in accordance with the data amount required for data processing for protecting privacy, such as k-anonymization. For example, in a section where k or more vehicles 2 having data of a same attribute are present, it is determined that there is data of an amount required for data processing, and the transmission speed of the data (vehicle information 700) is lowered.

Figure 12:
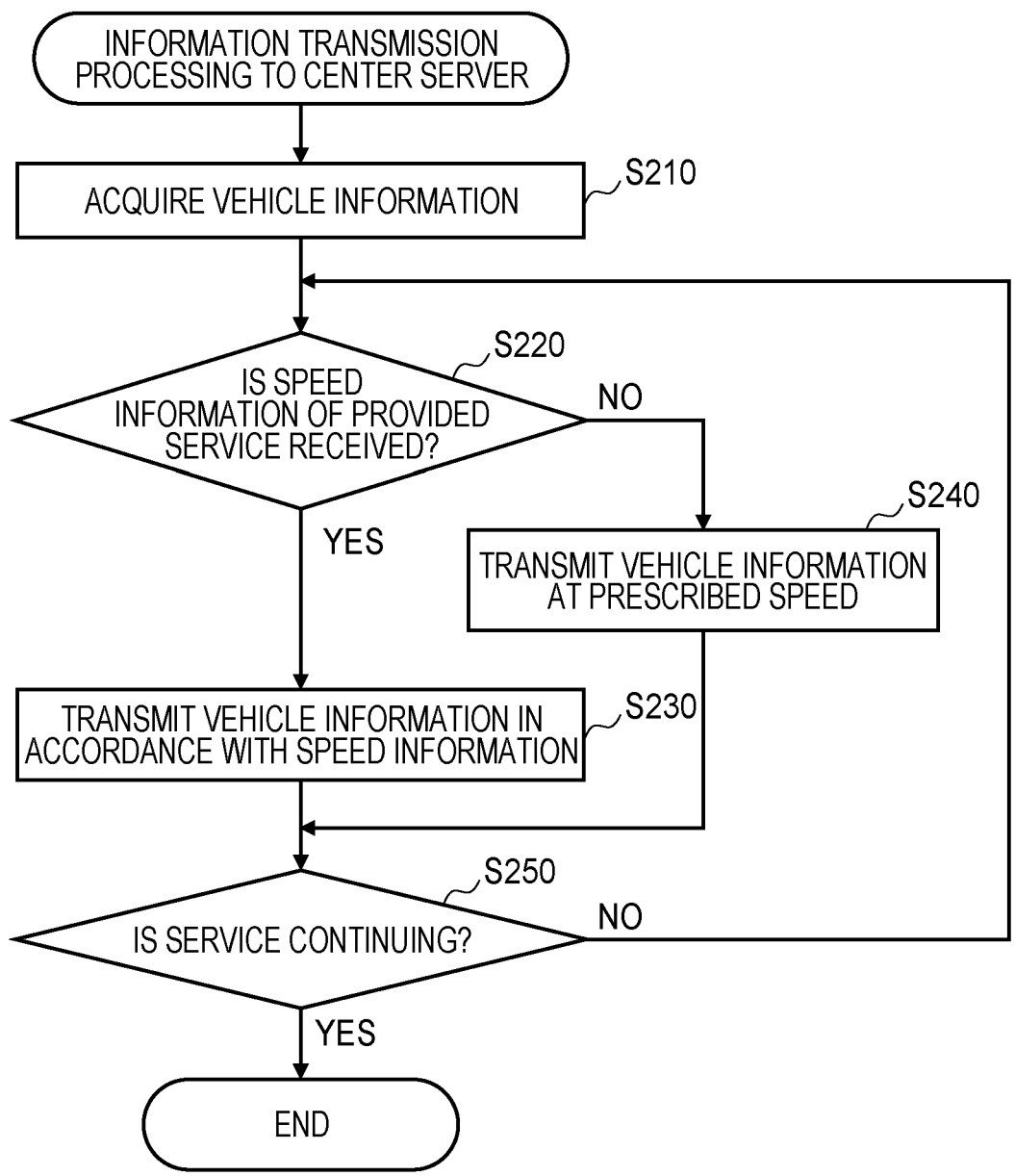
FIG. 12 is a transmission flowchart of the vehicle information of the in-vehicle information collecting device.

FIG. 12 is a flowchart of transmission processing of the vehicle information 700 to the center server 5, which is executed by the CPU 102 of the in-vehicle information collecting device 20.

In step S210, the vehicle information collecting unit 150 of the CPU 102 receives the vehicle control packet 1000 from an in-vehicle ECU such as the steering ECU 106, and acquires the vehicle information 700 from the received vehicle control packet 1000.

In step S220, the information control unit 140 of the CPU 102 extracts the service ID provided to the user by the display device 116 or the navigation system 117, from the vehicle information 700 collected by the vehicle information collecting unit 150, and determines whether or not the speed information 900 of the provided service has been received from the center server 5, on the basis of the extracted service ID. When the speed information 900 of the service ID has been received from the center server 5, the information control unit 140 of the CPU 102 proceeds to the processing of step S230. When the speed information 900 of the service ID has not been received from the center server 5, the information control unit 140 proceeds to the processing of step S240.

In step S230, the information control unit 140 of the CPU 102 outputs a communication speed control instruction according to the speed information 900 specified by the service ID, to the transmission information processing unit 130. The transmission information processing unit 130 transmits the vehicle information 700 to the center server 5 at a transmission speed according to the communication speed control instruction.

In step S240, the information control unit 140 of the CPU 102 outputs a communication speed control instruction according to a speed prescribed by the center server 5, to the transmission information processing unit 130. The transmission information processing unit 130 transmits the vehicle information 700 to the center server 5 at a transmission speed according to the communication speed control instruction.

In step S250, the information control unit 140 of the CPU 102 determines whether or not the service provided to the user by the display device 116 or the navigation system 117 is continuing. When the service is continuing, the information control unit 140 of the CPU 102 outputs, to the transmission information processing unit 130, a communication speed control instruction for continuing transmission of the vehicle information 700 to the center server 5 with the speed information 900 specified by the service ID, and terminates the processing in this routine. When the service is not continuing, the information control unit 140 of the CPU 102 returns to step S220 and repeats the processing of steps S220 to S250.

Figure 13:
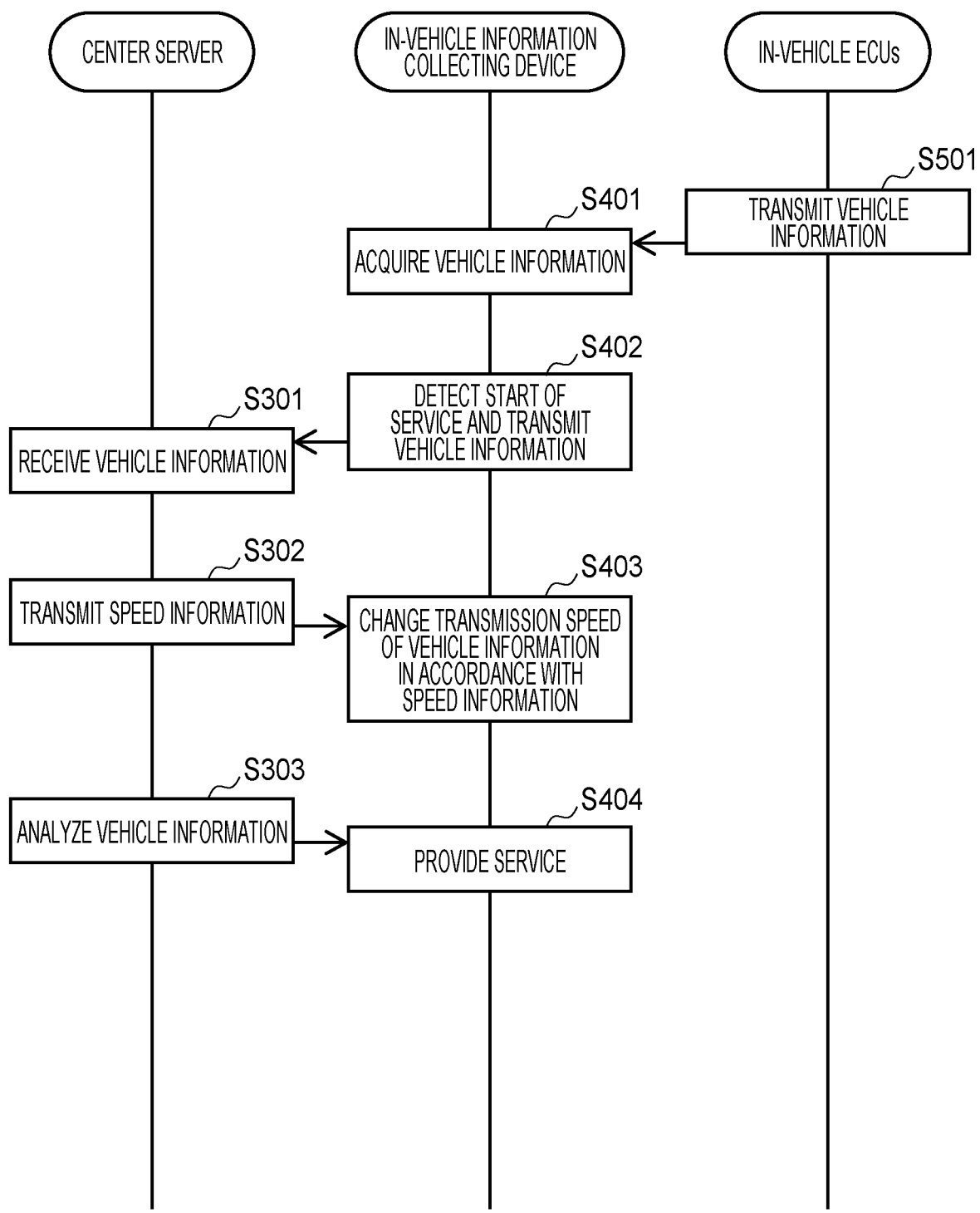
FIG. 13 is a sequence diagram of the vehicle information network system.

FIG. 13 is a sequence of the vehicle information network system.

In step S501, an in-vehicle ECU such as the steering ECU 106 and a sensor such as the GPS sensor 114 transmit the vehicle information 700 to the in-vehicle information collecting device 20 as information belonging to the vehicle control packet 1000.

In step S401, the in-vehicle information collecting device 20 acquires the vehicle information 700 as information belonging to the vehicle control packet 1000, from the in-vehicle ECU and the sensor.

In step S402, the in-vehicle information collecting device 20 detects a start of the service on the basis of the acquired vehicle information 700, and transmits the vehicle information 700 to the center server 5.

In step S301, the center server 5 receives the vehicle information 700 from the in-vehicle information collecting device 20 of the vehicle 2.

In step S302, the center server 5 generates the speed information 900 on the basis of the received vehicle information 700, and transmits the generated speed information 900 to the in-vehicle information collecting device 20.

In step S403, when receiving the speed information 900 from the center server 5, the in-vehicle information collecting device 20 changes the transmission speed of the vehicle information 700 in accordance with the speed information 900.

In step S303, the center server 5 analyzes the received vehicle information 700, and transmits the analysis information 800 indicating the analysis result to the in-vehicle information collecting device 20.

In step S404, the in-vehicle information collecting device 20 provides the user with the analysis information 800 as a service.

Figure 14:
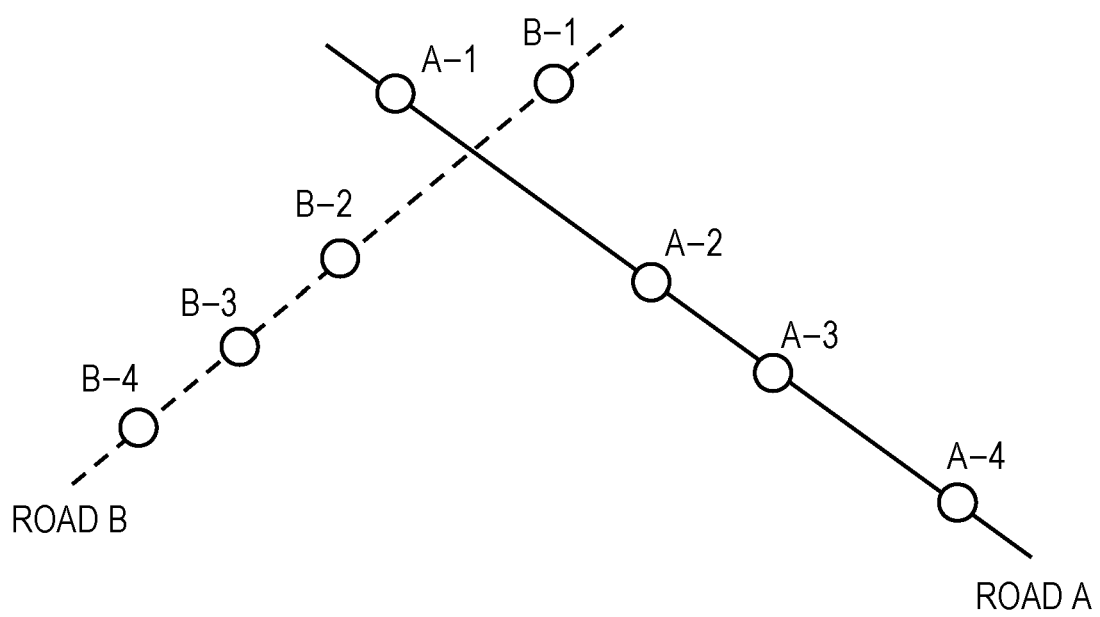
FIG. 14 is a configuration diagram illustrating a road structure.

FIG. 14 is a configuration diagram illustrating a road structure. In FIG. 14, in a case where a road on which the vehicle 2 is traveling is present in a state where, for example, a road A and a road B cross each other, each of the roads A and B is divided into a plurality of sections, and road-ID points A-1 to A-4 . . . are set in individual sections of the road A, while road-ID points B-1 to B-4 . . . are set in individual sections of the road B. Information on the road-ID point in each section of the road A and the road B is managed by the data analysis unit 530.

FIG. 15 is an explanatory view illustrating a configuration of map information. Map information 1500 is information stored in the vehicle 2 and the center server 5, and includes each piece of information of a road ID 1501, latitude 1 information 1502, latitude 2 information 1503, longitude 1 information 1504, longitude 2 information 1505, a connection road ID 1506, latitude 1 information 1507, latitude 2 information 1508, longitude 1 information 1509, longitude 2 information 1510, a connection road ID 1511, and a lane number 1512

The road ID 1501 is information indicating an ID that is set for each road. To each road, a number unique to each road is preset as a road ID.

The latitude 1 information 1502 is position information at a connection point 1 where a road crosses a road. The latitude 1 information 1502 indicates an angle, and represents an angle formed by a line in contact with the point and an earth's axis connecting the north pole and the south pole.

The latitude 2 information 1503 is position information at the connection point 1, and shows N indicating the north or S indicating the south.

The longitude 1 information 1504 is position information at the connection point 1. The longitude 1 information 1504 indicates an angle, and represents an angle between a meridian passing through the point and a prime meridian. The longitude 2 information 1505 is position information at the connection point 1, and shows W indicating the west or E indicating the east.

The connection road ID 1506 is information indicating the road ID of a connection destination connected to another road at the connection point 1.

The latitude 1 information 1507 is position information at a connection point 2. The latitude 1 information 1507 indicates an angle, and represents an angle formed by a line in contact with the point and an earth's axis connecting the north pole and the south pole. The latitude 2 information 1508 is position information at the connection point 2, and shows N indicating the north or S indicating the south.

The longitude 1 information 1509 is position information at the connection point 2. The longitude 1 information 1509 indicates an angle, and represents an angle between a meridian passing through the point and a prime meridian. The longitude 2 information 1510 is position information at the connection point 2, and shows W indicating the west or E indicating the east.

The connection road ID 1511 is information indicating the road ID of a connection destination connected to another road at the connection point 2.

The lane number 1512 is information indicating the number of lanes constituting each road.

Here, when the center server 5 manages the vehicle information 700 transmitted from the vehicle 2, among the information stored in the vehicle information DB 551, combining information indicating a history of the position information of the vehicle 2 (the first latitude information 914 to the second longitude information 917) or information such as the entrance tollgate 906, the final exit tollgate 907, the entry time 908, and exit time 909 generates personal privacy information. Therefore, in the present embodiment, for example, k-anonymization processing is executed by the anonymization processing unit 540. The k-anonymization is one of data processing methods for making it difficult to identify a specific individual.

The k-anonymization processing is processing of converting data such that k or more data having a same attribute are present (satisfying k-anonymity) in target data (data constituting the vehicle information 700). By applying the k-anonymization processing to the target data, the probability that an individual is specified can be reduced to 1/k or less. For example, when anonymizing the position information of the vehicle 2 under the condition of k=2, a section is expanded such that there are two or more vehicles having same position information in a certain section. In the anonymization processing, a section is created so as to include data with k pieces of vehicle data, and data with only less than k pieces of vehicle data remaining in each section is deleted.

Specifically, for example, in a service of the passable map, data of the road-ID is anonymized as follows. In k-anonymizing the road-ID point A-3 of the road A shown in FIG. 14, A-3 is rounded with adjacent road-ID point A-2 or A-4 within the same road A. If the k value is still not satisfied, A-3 is further sequentially rounded with another adjacent road (RSU)-ID point within the same road A. However, if the k value is not yet satisfied even if all the road-ID points in the road A are rounded, A-3 is rounded with the road B adjacent to (connected with) the road A.

In the service of the passable map, for example, in a case of performing anonymization processing on a record of the map information 1500 of the vehicle 2 having passed through a specific road-ID point, the following processing is executed.

Procedural step 1: Create a section of a road-ID (see a record 1500-1 of the map information 1500 in FIG. 15).

Procedural step 2: When the anonymization threshold value K>0 is given, the section is extended such that the number of records of the map information 1500 of the vehicle 2 in the section becomes K or more (see the record 1500-2 in the map information 1500 in FIG. 15).

Procedural step 3: When the number of data in the section is less than K, data of that layer is deleted (see record 1500-Ne of the map information 1500 in FIG. 15).

In the present embodiment, the in-vehicle information collecting device 20 has an in-vehicle controller (CPU 102) that transmits/receives information including the vehicle information 700 on each vehicle 2, to/from the center server 5 via a communication unit (the roadside device 3 and the network 4). The center server 5 includes a server controller (CPU 502) that transmits/receives information to/from the in-vehicle controller via the communication unit.

At this time, when receiving the vehicle information 700 from the in-vehicle controller, the server controller analyzes the received vehicle information, generates the speed information 900 that defines a transmission speed of the vehicle information 700 on the basis of an analysis result, and transmits the generated speed information 900 to the in-vehicle controller. When receiving the speed information 900 from the server controller, the in-vehicle controller controls a communication amount of the vehicle information 700 to the server controller on the basis of the received speed information 900.

As described above, the communication amount of the vehicle information 700 transmitted from the in-vehicle information collecting device 20 to the center server 5 is controlled by the speed information 900. Therefore, it is possible to inhibit suppression of a communication band of a communication route connecting the in-vehicle information collecting device 20 with center server 5, and suppression of a data capacity for data to be stored in the center server 5. As a result, the communication cost can be reduced, the communication band can be protected, and the data storage cost can be reduced.

In addition, the server controller can determine the type of the data analysis service from the analysis result of the received vehicle information 700, and can generate the speed information 900 in accordance with the determination result. In this case, it is possible to exclusively transmit the vehicle information 700 of the data amount required for the data analysis service from the in-vehicle information collecting device 20 to the center server 5.

In addition, on the basis of the analysis result of the received vehicle information 700, the server controller can determine, as a first communication target, a communication target whose communication amount of the vehicle information 700 is in a range smaller than a set value or a communication target whose communication amount of the vehicle information 700 shows a rare tendency value with respect to the set value, can generate speed information 900 having a transmission speed higher than the speed information 900 for another communication target that is out of the first communication target, as the speed information 900 for the first communication target on the basis of the determination result, and can transmit the generated speed information 900 to the in-vehicle controller of the in-vehicle information collecting device 20 belonging to the first communication target. At this time, for example, a vehicle mounted with a communication target (in-vehicle information collecting device 20) whose communication amount of the vehicle information 700 shows a rare tendency value with respect to the set value, for example, such as a vehicle that has suddenly stopped, can transmit the vehicle information 700 to the center server 5 preferentially over other vehicles.

In addition, on the basis of the analysis result of the received vehicle information 700, the server controller can determine, as a second communication target, a communication target whose communication amount of the vehicle information 700 is in a range larger than the set value or a communication target whose communication amount of the vehicle information 700 shows a standard value with respect to the set value, can generate speed information 900 in which a transmission speed or a transmission frequency of the vehicle information 700 is lower than the speed information 900 with a high transmission speed, as the speed information 900 for the second communication target on the basis of the determination result, and can transmit the generated speed information 900 to the in-vehicle controller of the in-vehicle information collecting device 20 belonging to the second communication target. At this time, for example, for a communication target (in-vehicle information collecting device 20) whose communication amount of the vehicle information 700 shows a standard value with respect to the set value, a transmission speed or a transmission frequency of the vehicle information 700 to be transmitted to the center server 5 can be lowered.

Further, instead of the communication target in which the communication amount of the vehicle information 700 indicates a standard value with respect to the set value, it is also possible to determine that a parameter average value of the vehicle information 700 of the vehicle 2 present in a certain section is within a certain range of values, or determine that a deviation value of a parameter, such as a speed, to be used for data analysis is within a certain range, to determine that the communication target for which the determination result is obtained is a communication target in which the communication amount of the vehicle information 700 exhibits an ordinary tendency with respect to the set value.

According to the present embodiment, it is possible to determine the communication amount of the vehicle information to be subjected to data analysis in accordance with the service, and as a result, it is possible to achieve reduction of the communication cost, protection of the communication band, and reduction of the data storage cost in the data analysis service.

It is to be noted that the above-described embodiment and various modified examples are merely examples. As long as the features of the present invention are not impaired, the present invention is not limited to the above-described embodiment, and other forms considered within the technical idea of the present invention are also included within the scope of the present invention. That is, a part of a configuration of the embodiment may be deleted, replaced, or added with another configuration.

In addition, each of the above-described configurations, functions, and the like may be realized by hardware, for example, by designing part or all of them with an integrated circuit or the like. In addition, each of the above-described configurations, functions, and the like may be realized by software by interpreting and executing a program in which a processor realizes each function. Information such as a program, a table, a file, or the like that realizes each function can be stored in a storage device such as a memory, a hard disk, or a solid state drive (SSD), or in a storage medium such as an integrated circuit (IC) card, a secure digital (SD) memory card, or a digital versatile disk (DVD).

What is claimed is:

1. An information communication system comprising:
    a plurality of in-vehicle information collecting devices individually mounted on a plurality of vehicles;
    a center server configured to manage each of the plurality of in-vehicle information collecting devices as a communication target; and
    a communication unit configured to relay communication between each of the plurality of in-vehicle information collecting devices and the center server, wherein
    each of the in-vehicle information collecting devices:
    includes an in-vehicle controller configured to transmit/receive information including vehicle information on each of the vehicles, to/from the center server via the communication unit,
    the center server:
    includes a server controller configured to transmit/receive information to/from an in-vehicle controller of each of the in-vehicle information collecting devices via the communication unit, the server controller:
    when receiving the vehicle information from each of the in-vehicle controllers, analyzes the received vehicle information, generates speed information that defines a transmission speed of the vehicle information based on an analysis result, and transmits the generated speed information to each of the in-vehicle controllers, and
    each of the in-vehicle controllers:
    controls, when receiving the speed information from the server controller, a communication amount of the vehicle information to the server controller based on the received speed information, and
    the server controller:
    based on an analysis result of the received vehicle information, determines, as a first communication target, a communication target whose communication amount of the vehicle information is in a range smaller than a set value or a communication target whose communication amount of the vehicle information shows a rare tendency value with respect to the set value; generates speed information having a transmission speed higher than speed information for another communication target, as speed information for the first communication target based on the determination result; and transmits the generated speed information to an in-vehicle controller of an in-vehicle information collecting device belonging to the first communication target.

2. The information communication system according to claim 1, wherein
    the server controller:
    determines a type of a data analysis service from an analysis result of the received vehicle information, and generates the speed information in accordance with a determination result.

3. The information communication system according to claim 1, wherein
    the server controller:
    based on an analysis result of the received vehicle information, determines, as a second communication target, a communication target whose communication amount of the vehicle information is in a range larger than the set value or a communication target whose communication amount of the vehicle information shows a standard value with respect to the set value, as speed information for the second communication target based on the determination result; generates speed information in which a transmission speed or a transmission frequency of the vehicle information is lower than the speed information with a high transmission speed; and transmits the generated speed information to an in-vehicle controller of an in-vehicle information collecting device belonging to the second communication target.

4. An information communication method in an information communication system comprising:
    a plurality of in-vehicle information collecting devices individually mounted on a plurality of vehicles;
    a center server configured to manage each of the plurality of in-vehicle information collecting devices as a communication target; and
    a communication unit configured to relay communication between each of the plurality of in-vehicle information collecting devices and the center server, wherein
    each of the in-vehicle information collecting devices:
    includes an in-vehicle controller configured to transmit/receive information including vehicle information on each of the vehicles, to/from the center server via the communication unit, and
    the center server:
    includes a server controller configured to transmit/receive information to/from an in-vehicle controller of each of the in-vehicle information collecting devices via the communication unit,
    the information communication method comprising:
    analyzing, when the server controller receives the vehicle information from each the in-vehicle controller, the received vehicle information;
    generating, by the server controller, speed information defining a transmission speed of the vehicle information, based on an analysis result in the analyzing;
    transmitting, by the server controller, the speed information generated in the generating to each the in-vehicle controller;
    controlling, when each the in-vehicle controller receives the speed information from the server controller, a communication amount of the vehicle information to the server controller based on the received speed information;
    determining, by the server controller, as a first communication target, a communication target whose communication amount of the vehicle information is in a range smaller than a set value or a communication target whose communication amount of the vehicle information shows a rare tendency value with respect to the set value, based on an analysis result in the analyzing;
    generating, by the server controller, as speed information for the first communication target, speed information having a transmission speed higher than speed information for another communication target, based on a result of the determination; and
    transmitting, by the server controller, the speed information generated in the generating to an in-vehicle controller of an in-vehicle information collecting device belonging to the first communication target.

5. The information communication method according to claim 4, further comprising the step of:
    determining, by the server controller, a type of a data analysis service from an analysis result of the vehicle information, and generating the speed information in accordance with a determination result.

6. The information communication method according to claim 5, further comprising the steps of:

determining, by the server controller, as a second communication target, a communication target whose communication amount of the vehicle information is in a range larger than the set value or a communication target whose communication amount of the vehicle information shows a standard value with respect to the set value, based on an analysis result in the analyzing;

generating, by the server controller, as speed information for the second communication target, speed information in which a transmission speed or a transmission frequency of the vehicle information is lower than the speed information with a high transmission speed, based on a result of the determination; and transmitting, by the server controller, the speed information generated in the generating to an in-vehicle controller of an in-vehicle information collecting device belonging to the second communication target.

7. A server for managing, as a communication target, each of a plurality of in-vehicle information collecting devices individually mounted on a plurality of vehicles, the server comprising a controller configured to transmit/receive information to/from each of the in-vehicle information collecting devices via a communication unit, wherein the controller:

when receiving vehicle information from each of the in-vehicle information collecting devices, analyzes the received vehicle information; generates speed information defining a transmission speed of the vehicle information in each of the in-vehicle information collecting devices based on an analysis result; and transmits the generated speed information to each of the in-vehicle information collecting devices; and determines, as a first communication target, a communication target whose communication amount of the vehicle information is in a range smaller than a set value or a communication target whose communication amount of the vehicle information shows a rare tendency value with respect to the set value, based on an analysis result of the received vehicle information; generates, as speed information for the first communication target, speed information having a transmission speed higher than speed information for another communication target, based on a result of the determination; and transmits the generated speed information to an in-vehicle information collecting device belonging to the first communication target.

8. The server according to claim 7, wherein the controller:

determines a type of a data analysis service from an analysis result of the received vehicle information, and generates the speed information in accordance with a determination result.

9. The server according to claim 8, wherein the controller:

determines, as a second communication target, a communication target whose communication amount of the vehicle information is in a range larger than the set value or a communication target whose communication amount of the vehicle information shows a standard value with respect to the set value, based on an analysis result of the received vehicle information; generates, as speed information for the second communication target, speed information in which a transmission speed or a transmission frequency of the vehicle information is lower than the speed information with a high transmission speed, based on a result of the determination; and transmits the generated speed information to an in-vehicle information collecting device belonging to the second communication target.

* * * * *